United States Patent [19]
Matsuura et al.

[11] Patent Number: 5,735,248
[45] Date of Patent: Apr. 7, 1998

[54] FUEL INJECTION METHOD FOR GAS FUEL ENGINE

[75] Inventors: Hiromi Matsuura; Hideki Minami; Susumu Nakajima; Kazuhiro Ueda; Shigeru Aoki; Toshiyuki Nishida, all of Wako, Japan

[73] Assignee: Honda Giken Kogyo Kabushiki Kaisha, Tokyo, Japan

[21] Appl. No.: 698,519

[22] Filed: Aug. 15, 1996

[30] Foreign Application Priority Data

Sep. 4, 1995 [JP] Japan ................... 7-226882

[51] Int. Cl.$^6$ ................................ F02M 21/02
[52] U.S. Cl. ........................... 123/527; 123/478
[58] Field of Search ..................... 123/478, 526, 123/527, 528, DIG. 12

[56] References Cited

U.S. PATENT DOCUMENTS

| | | | |
|---|---|---|---|
| 3,125,085 | 3/1964 | Kaufmann | 123/527 |
| 4,505,249 | 3/1985 | Young | 123/527 |
| 5,203,305 | 4/1993 | Porter et al. | 123/527 X |
| 5,329,908 | 7/1994 | Tarr et al. | 123/527 |
| 5,477,830 | 12/1995 | Beck et al. | 123/478 X |
| 5,487,362 | 1/1996 | Welley et al. | 123/526 X |
| 5,533,492 | 7/1996 | Willey et al. | 123/527 X |
| 5,553,575 | 9/1996 | Beck et al. | 123/198 F |

FOREIGN PATENT DOCUMENTS

| | | |
|---|---|---|
| 2 304 767 | 8/1974 | Germany . |
| 59-138763 A | 8/1984 | Japan . |
| 133562 | 6/1929 | Switzerland . |
| WO 94/13946 | 6/1994 | WIPO . |

OTHER PUBLICATIONS

Lynch, "Parallel Induction: A Simple Fuel Control Method for Hydrogen Engines", *Int. J. Hydrogen Energy*, vol. 5, No. 9, 1 Sep. 1983, Norwich, Great Britain, pp. 721–730.

Peschka, Liquid Hydrogen Fueled Automotive Vehicles in Germany—Status and Development, *Int. J Hydrogen Energy*, vol. 8, No. 9, 1 Nov. 1986, Norwich, Great Britain, pp. 721–728.

*Primary Examiner*—Tony M. Argenbright
*Attorney, Agent, or Firm*—Merchant, Gould, Smith, Edell, Welter & Schmidt, P.A.

[57] ABSTRACT

A fuel injection method wherein optimum fuel injection timing in a fuel-injection type gas fuel engine is determined by setting fuel injection end timing to be after the start of opening of an intake valve. That is, when injection ends in a first half of the intake valve open period the volumetric efficiency ηv falls and the engine output also falls, because the injection period overlaps with a period of positive pressure arising inside the intake pipe before opening of the intake valve, but when injection ends in a second half of the intake valve open period the volumetric efficiency ηv rises and the engine efficiency also rises, because the injection period overlaps with a period of negative pressure arising in the intake pipe during the first half of the intake value open period. Consequently, when fuel is injected during this trough in the intake port pressure, the volumetric efficiency increases and the engine output also increases by several percent.

3 Claims, 10 Drawing Sheets

INJECTION END TIMING (CRANK ANGLE °)

INJECTION END TIMING (CRANK ANGLE °)

FUEL INJECTION METHOD FOR GAS FUEL ENGINE

BACKGROUND OF THE INVENTION

1. Field of the Invention

The present invention relates to a fuel injection method for a gas fuel engine.

2. Description of the Related Art

As substitutes for gasoline engines in which gasoline is used as fuel and for diesel engines in which light oil is used as fuel, gas fuel engines using natural gas (hereinafter abbreviated as NG) or LPG as fuel have come into use. Fuel supply systems in these gas fuel engines include the following types:

(a) Firstly, there is a fuel supply system of "Gas Fuel Engine" disclosed in Japanese Patent Laid-Open Publication No. SHO 59-138763. In this system, a mixer is provided in place of the carburetor used in a gasoline engine, and low-pressure fuel gas and a suitable quantity of air are mixed by this mixer. This mixer method is presently widely used mainly in taxis.

(b) Secondly, there are fuel supply systems using the fuel injection method. This fuel injection method is one wherein fuel injection technology employed in diesel engines and gasoline engines is applied and suitable quantities of gaseous fuel are injected into an intake manifold. This injection of gaseous fuel is performed by injectors, and the optimum value of the quantity of fuel injected is calculated by an ECU (Electronic Control Unit) on the basis of information such as the engine speed, the negative pressure (the intake negative pressure) arising in the intake system, the throttle angle, the engine cooling water temperature and the concentration of oxygen in the exhaust gas.

A graph showing an example of the fuel injection timing of a conventional gasoline engine is shown in FIG. 13. The horizontal axis is injection end timing and is shown by crank angle.

In a gasoline engine, for reasons such as that because when fuel is injected while the intake valve is open it is not possible to secure sufficient time for evaporation of the liquid fuel and that consequently mixing tends to be incomplete, fuel is generally injected avoiding the period during which the intake valve is open. Accordingly, as shown in FIG. 13, if the intake valve is open for a crank angle of about 370° to about 570°, fuel injection is for example started at crank angle 180° and ended at crank angle 270°.

Now, for NG and for gasoline mist the volume of fuel per unit heat produced is greatly different. With respect to a volume of 1.0 for gasoline, the corresponding volume of NG is 600. Thus, in the case of NG, the volume of fuel is larger.

A graph showing an example of the fuel injection timing of a conventional gas fuel engine is shown in FIG. 14 and corresponds to FIG. 13. Because the volume of fuel is much larger, as explained above, the fuel injection time in this example has a width in terms of crank angle of about 200°, with fuel injection starting at crank angle 70° and ending at crank angle 270°.

In the mixer method (a) described above, the mixer is a type of throttle mechanism having a venturi or the like, and a pressure loss occurs in proportion with the degree of the throttling. Because of this, the amount of intake air decreases and the volumetric efficiency ηv falls. When to avoid this problem the mixer and the intake manifold are increased in size, besides enlargement of the engine space and the vehicle becoming large due to the engine becoming large, there is an adverse affect on the output characteristics of the engine and on fuel combustion in the partial load region, and therefore from the points of view of fuel consumption, emissions and driveability this is not a preferable solution.

In the fuel injection method (b) described above, there are none of the above-mentioned adverse affects caused by throttling. However, in the case of NG the proportion of the volume of the fuel/air mixture occupied by the fuel reaches 10% and in the case of $H_2$ the proportion of the volume of the fuel/air mixture occupied by the fuel reaches 30%. The proportion of intake air in the mixture decreases by an amount corresponding to the increase in the volume of the fuel, and compared to a gasoline engine or a diesel engine the amount of intake air decreases and the volumetric efficiency ηv falls.

Also, the above-mentioned fuel injection method is based on gasoline engine fuel injection technology, as shown in FIG. 14, and there are aspects wherein factors peculiar to NG are not fully taken into account, specifically the matter of the fuel volume and the fact that evaporation is not necessary.

SUMMARY OF THE INVENTION

It is therefore an object of the present invention to provide a fuel injection method with which it is possible to establish a gas fuel engine matched to factors peculiar to NG and to obtain a predetermined volumetric efficiency ηv without greatly enlarging an existing engine.

In a fuel injection method according to a first aspect of the invention, the fuel injection end timing is set to after the start of opening of the intake valve. Because the injection period therefore overlaps with a period over which a negative pressure arises inside the intake pipe during the first half of the period for which the intake valve is open, the volumetric efficiency ηv increases and the engine output also increases by several percent.

In a fuel injection method according to a second aspect of the invention, top dead center and ignition are at crank angle 0° and the fuel injection end timing is set so as to be in the range of crank angle 480° to 690°. As a result, in the range of crank angle 480° to 690° the knock margin is greater than at other times, and by setting the fuel injection end timing in this range it is possible to stabilize fuel combustion and increase volumetric efficiency and engine output.

In a fuel injection method according to a third aspect of the invention, the overall injection is carried out divided into a plurality of separate smaller injection periods, and these injection periods are made to coincide with periods during which the intake port pressure falls in the shape of a trough. Because the injection period overlaps with a period over which a negative pressure arises inside the intake pipe during the first half of the period for which the intake valve is open, the volumetric efficiency ηv increases and the engine output also increases by several percent. Also, because the injection period sometimes extends beyond the period of this trough during high-load running at which time a large quantity of fuel is consumed, if fuel injection is carried out in a plurality of divided small injection periods, it can be kept in the troughs, whereby high output can be obtained during high-load running.

BRIEF DESCRIPTION OF THE DRAWINGS

Preferred embodiments of the invention will hereinafter be described in more detail, by way of example, with reference to the accompanying drawings, in which.

DETAILED DESCRIPTION OF THE PREFERRED EMBODIMENTS

Figure 1:
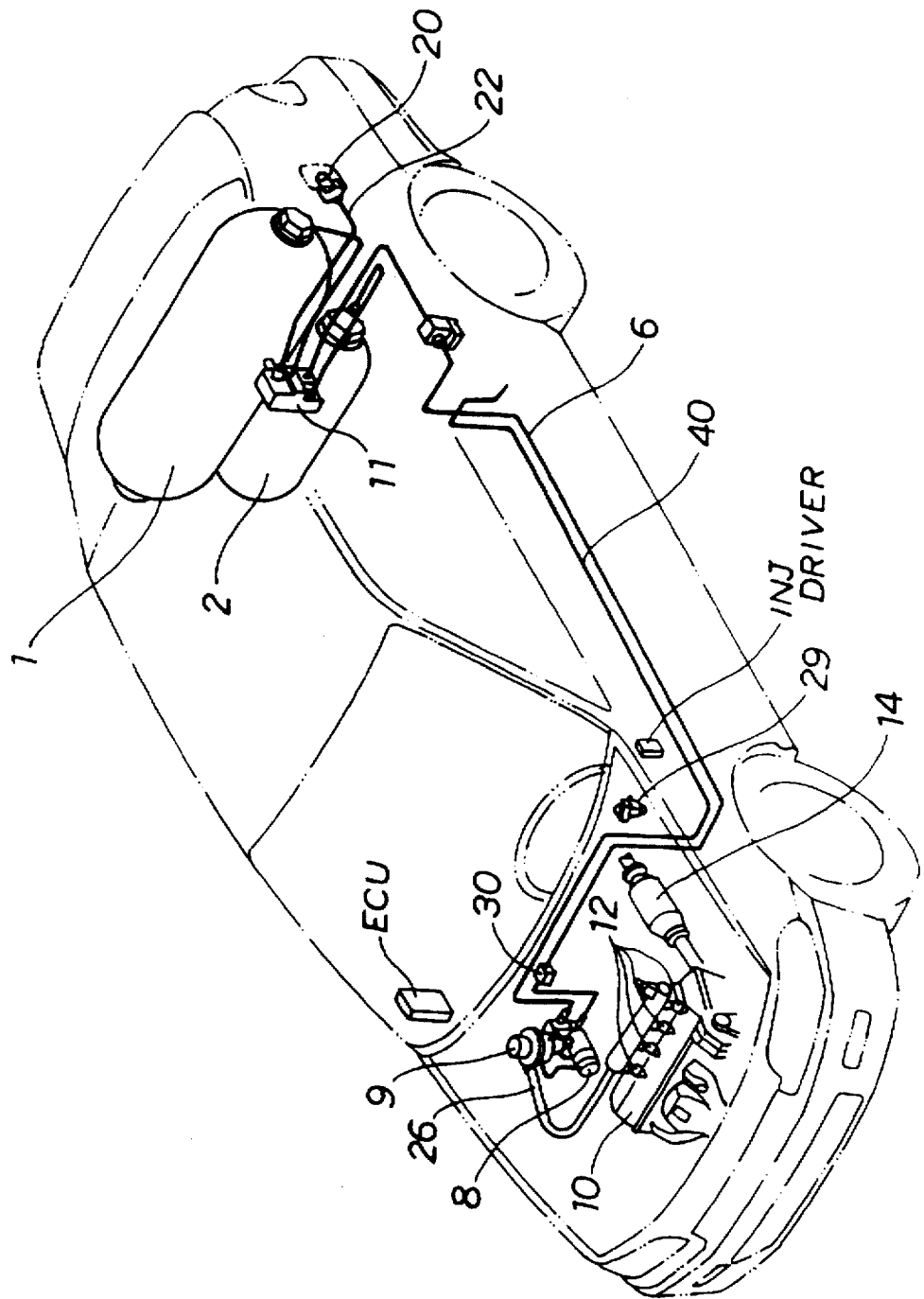
FIG. 1 is a schematic view showing the disposition in a vehicle of a fuel supply system of a gas fuel engine.

In FIG. 1, two tanks 1, 2 containing NG at a high pressure of for example 200 Kg/cm$^2$ are mounted in a trunk space in the rear of a vehicle and a water-cooled gas engine 10 is mounted in the front of the vehicle.

A high-pressure pipe 6 for carrying high-pressure gas from inside the tanks 1, 2 to the gas engine 10 side is mounted below the cabin in the middle of the vehicle. A primary pressure regulator 8 as a pressure-reducing device for reducing the pressure of the gas carried by the high-pressure pipe 6 to, for example, about 7 Kg/cm$^2$ and a secondary pressure regulator 9 for further reducing the pressure of this pressure-reduced gas to, for example, about 2 Kg/cm$^2$ by gauge pressure are disposed in the engine space in the front of the vehicle.

The gas reduced in pressure by the secondary pressure regulator 9 is injected into cylinders of the engine 10 through a plurality of injectors 12 and is discharged through a catalytic convertor 14 of the exhaust system of the engine 10.

Figure 2:
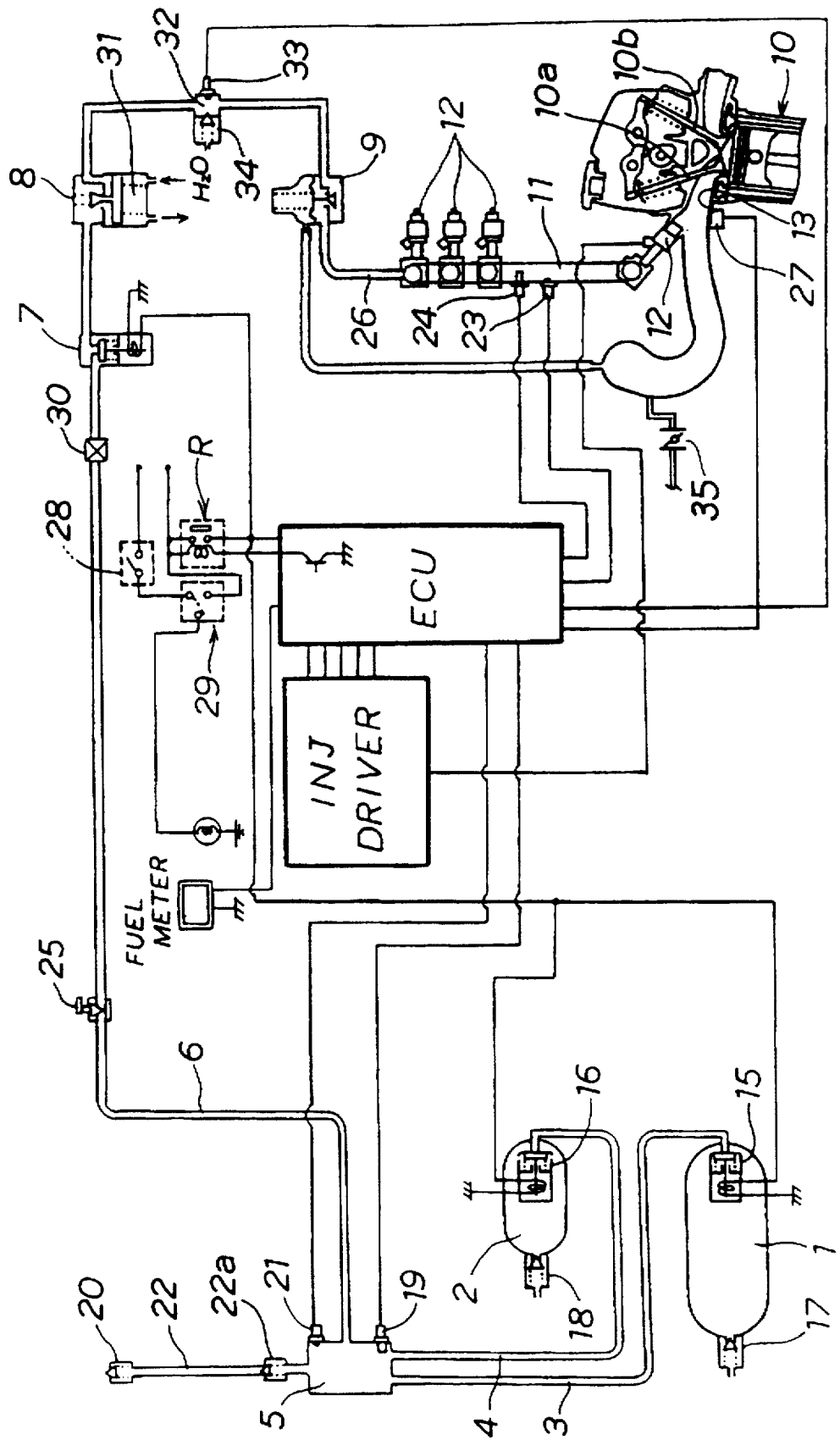
FIG. 2 is a view showing in detail a fuel supply system of a gas fuel engine.

In FIG. 2, a tank pipe 22 is disposed between the two tanks 1, 2 and a fuel filling opening 20. A nonreturn valve 22a is provided in this tank pipe 22 to prevent back flow of filled gas, and downstream of this a tank gas detecting part 5 is provided as a part connecting the tank pipe 22 to high-pressure pipes 3, 4.

A temperature sensor 19 for measuring the tank gas temperature and a pressure sensor 21 for detecting the tank gas pressure are provided in the tank gas detecting part 5.

First magnetic cutoff valves 15, 16 are provided in inlet openings of the tanks 1, 2 respectively, and these first magnetic cutoff valves 15, 16 are controlled to open and close by an ECU (Electronic Control Unit). Also, relief valves 17, 18 are provided at the opposite ends of the tanks 1, 2 respectively.

A manual valve 25, which can be opened and closed by hand, is provided in the upstream side of the high-pressure pipe 6 and a filter 30 is provided in the downstream side. A second magnetic cutoff valve 7 is provided between the filter 30 and the primary pressure regulator 8, and this second magnetic cutoff valve 7 is controlled to open and close by the ECU. The primary pressure regulator 8 is provided with a water passage 31 through which can be passed cooling water having circulated around the engine 10.

A primary gas detector part 32 having a primary pressure sensor 33 is disposed downstream of the primary pressure regulator 8. This primary gas detector part 32 is provided with a relief valve 34, and a relief pipe 40 (see FIG. 1) is connected to the relief valve 34.

The secondary pressure regulator 9 is disposed downstream of the primary gas detector part 32, and the gas pressure of the gas finally supplied to the engine 10 is pressure-regulated by this secondary pressure regulator 9.

Gas precisely pressure-regulated by the secondary pressure regulator 9 is fed through a low-pressure pipe 26 into an intake manifold 11 and injected through intake ports 13 into the cylinders of the engine 10 by the injectors 12. The injection method in this preferred embodiment is the multi-point injection (MPI) method wherein a plurality of injectors 12 are provided in one-to-one correspondence with the cylinders. Reference numerals 10a and 10b designate an intake valve and an exhaust valve, respectively.

A secondary temperature sensor 23 for detecting a secondary gas temperature and a secondary pressure sensor 24 for detecting a secondary gas pressure are provided inside the intake manifold 11, and detection signals from these sensors are fed to the ECU, which limits the fuel injection. The ECU also takes into account other data of the engine 10 and carries out fuel injection control by driving an injection driver.

An inertia switch 29 is disposed below the steering wheel inside the passenger compartment of the vehicle. The inertia switch 29 is disposed together with a normally open relay R in a wiring line connecting an ignition switch 28 to the ECU. When the ignition switch 28 and the inertia switch 29 are ON (normal), the normally open relay R is closed, current is passed through the first magnetic cutoff valves 15, 16 and the second magnetic cutoff valve 7, and the first magnetic cutoff valves 15, 16 and the second magnetic cutoff valve 7 are thereby opened. When either the ignition switch 28 or the inertia switch 29 is OFF, the first magnetic cutoff valves 15, 16 and the second magnetic cutoff valve 7 are closed.

Reference number 27 indicates a pressure sensor for detecting pressure pulsation, and a detection signal thereof is inputted into the ECU. Reference number 35 indicates a throttle valve.

The ECU, on the basis of information from the temperature sensor 19, the pressure sensor 21, the secondary temperature sensor 23 and the secondary pressure sensor 24, executes steps such as, for example, closing the second magnetic cutoff valve 7 when the pressure has fallen below a certain level.

Figure 3A:
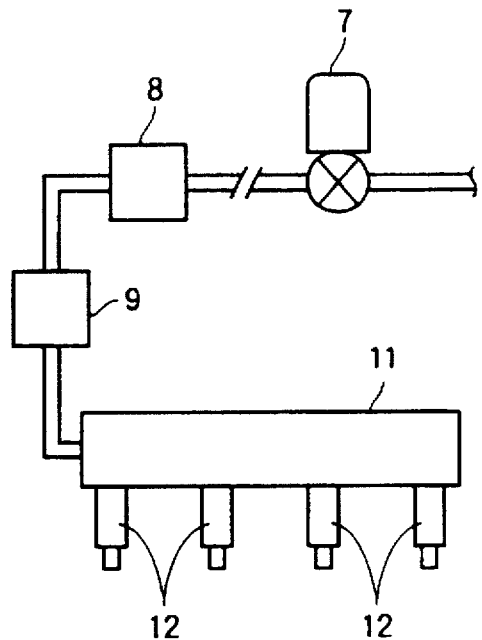
FIG. 3A and FIG. 3B are views showing layouts of devices disposed around an intake manifold.
Figure 3B:
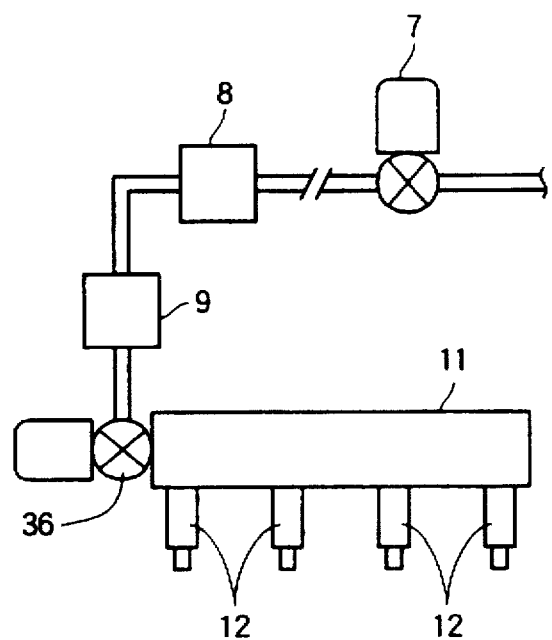

Layouts of devices disposed around the intake manifold 11 are shown in FIG. 3A and FIG. 3B.

In the device layout shown in FIG. 3A, the second magnetic cutoff valve 7, the primary pressure regulator 8, the secondary pressure regulator 9, the intake manifold 11 and the plurality of injectors 12 are disposed along the flow of the fuel. Because the distance from the second magnetic cutoff valve 7 to the intake manifold 11 is relatively large, as shown in FIG. 2, even if the second magnetic cutoff valve 7 has been closed, fuel collected between the second magnetic cutoff valve 7 and the intake manifold 11 leaks out through the injectors 12.

In FIG. 3B, a third magnetic cutoff valve 36 has been added on the upstream side of the intake manifold 11, and by this third magnetic cutoff valve 36 being closed when necessary, it is possible to hold fuel on the upstream side of the third magnetic cutoff valve 36 and the amount of fuel leaking from the injectors 12 decreases correspondingly.

Figure 4A:
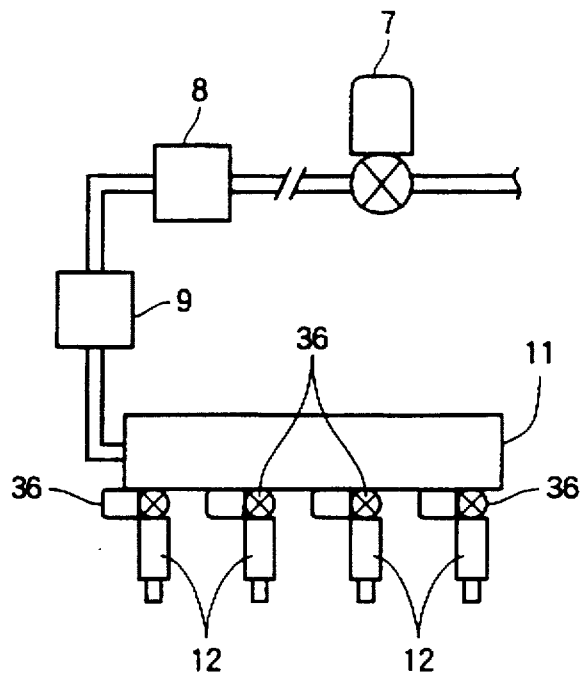
FIG. 4A and FIG. 4B are views showing layouts of devices disposed around an intake manifold.
Figure 4B:
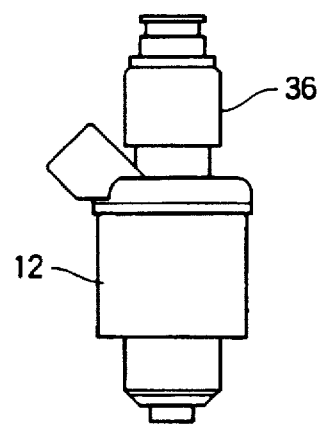

FIG. 4A and FIG. 4B show other examples of layouts of devices disposed around the intake manifold 11.

FIG. 4A shows an example wherein third magnetic cutoff valves 36 are interposed between the intake manifold 11 and each of the injectors 12.

FIG. 4B shows an example wherein third magnetic cutoff valves 36 are integrally built into the injectors 12.

Thus, in both of the examples shown in FIG. 4A and FIG. 4B, the amount of fuel leaking from the injectors 12 decreases.

Using the apparatus described above, collection of basic data and the method of the present invention were carried out.

Figure 5A:
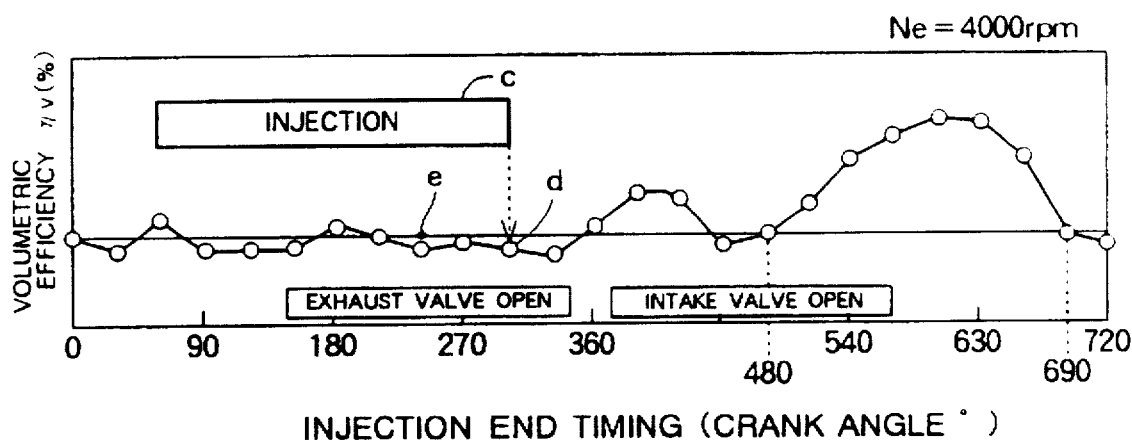
FIG. 5A and FIG. 5B are graphs showing basic data obtained using a gas fuel engine.
Figure 5B:
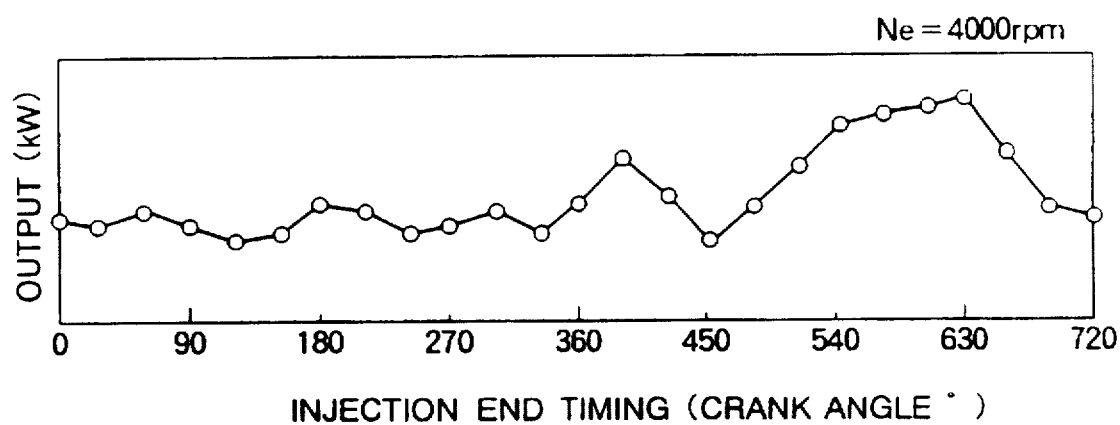

FIG. 5A and FIG. 5B are basic data graphs obtained using a gas fuel engine; the horizontal axis shows timing by crank angle (°), and the vertical axis is volumetric efficiency ηv or engine output. The exhaust valve open period and the intake valve open period are as shown in FIG. 5A. The engine speed is 4000 rpm, and the throttle valve 35 (see FIG. 2) was made fully open.

In FIG. 5A, for example the volumetric efficiency ηv obtained when injection was carried out with the conditions that the injection period was given a width in terms of crank angle of 240° and the injection end timing was 300°, as shown by c, was shown by a circle d. Similarly for the other circles, the injection end timing was shifted by 30° at a time and the volumetric efficiency ηv was obtained, its value at that time was shown by a circle and the circles were joined together with straight lines. From this graph a large trough can be seen in the vicinity of crank angle 450°.

The horizontal line e is the average value of the volumetric efficiency ηv over the range of crank angle 0° to 450°. When this horizontal line e is extended, a range of at least 480° to 690° is above this average.

Focusing on this 450° to 480° range, this 450° to 480° range lies in the middle of the intake valve open period, and before this range the volumetric efficiency ηv is decreasing and after this range it is increasing. Consideration of this yields the following:

In a case where injection ends in the first half of the intake valve open period: because the injection period overlaps with a period of positive pressure arising inside the intake pipe before opening of the intake valve, the volumetric efficiency ηv falls and output also falls.

In a case where injection ends in the second half of the intake valve open period: because the injection period overlaps with a period of negative pressure arising inside the intake pipe during the first half of the intake valve open period, the volumetric efficiency ηv rises and output also rises.

Accordingly, the present inventors discovered that it is possible to raise volumetric efficiency ηv and output by performing injection concentrated in a trough part of the intake port pressure pulsation.

FIG. 5B is a graph of engine output plotted by the same method; it substantially approximates to the curve of FIG. 5A, and a large trough can be seen in the vicinity of crank angle 450°.

Preferred Embodiments

Preferred embodiments of the invention will now be described.

Figure 6:
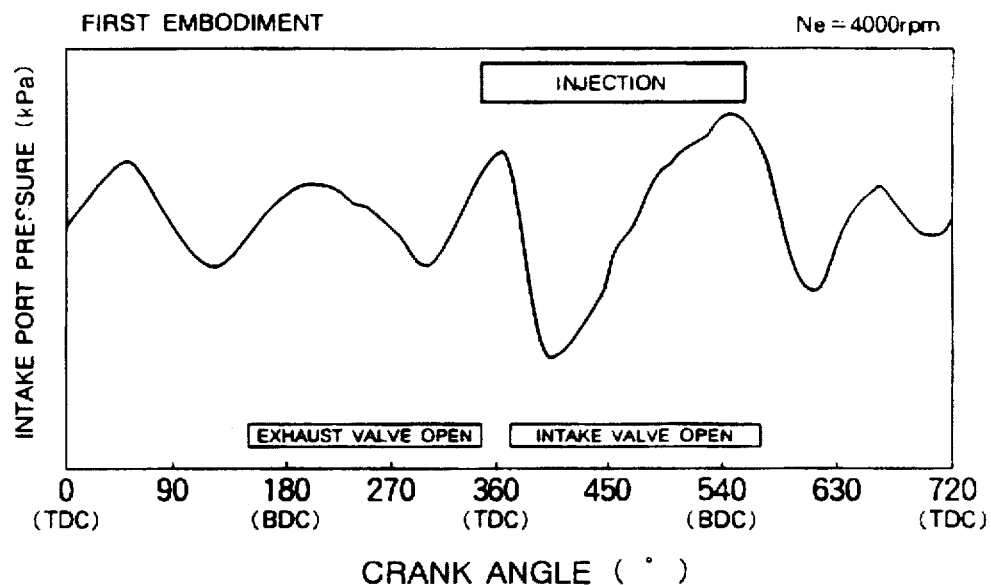
FIG. 6 is a waveform graph of pulsation inside an intake port of an example (First Preferred Embodiment) wherein single-stage injection was carried out at an engine speed of 4000 rpm.

FIG. 6 shows a waveform chart of a pulsation inside an intake port in an example (a first preferred embodiment) wherein single-stage injection was carried out at an engine speed Ne of 4000 rpm; the horizontal axis is crank angle and the vertical axis is intake port pressure; on the horizontal axis TDC is Top Dead Center and BDC is Bottom Dead Center. Ignition is at 0° (and similarly below).

In the first preferred embodiment, to cover the large trough in the intake port pressure at 450°, injection was started at crank angle 340° and injection was ended at crank angle 560°.

Figure 7:
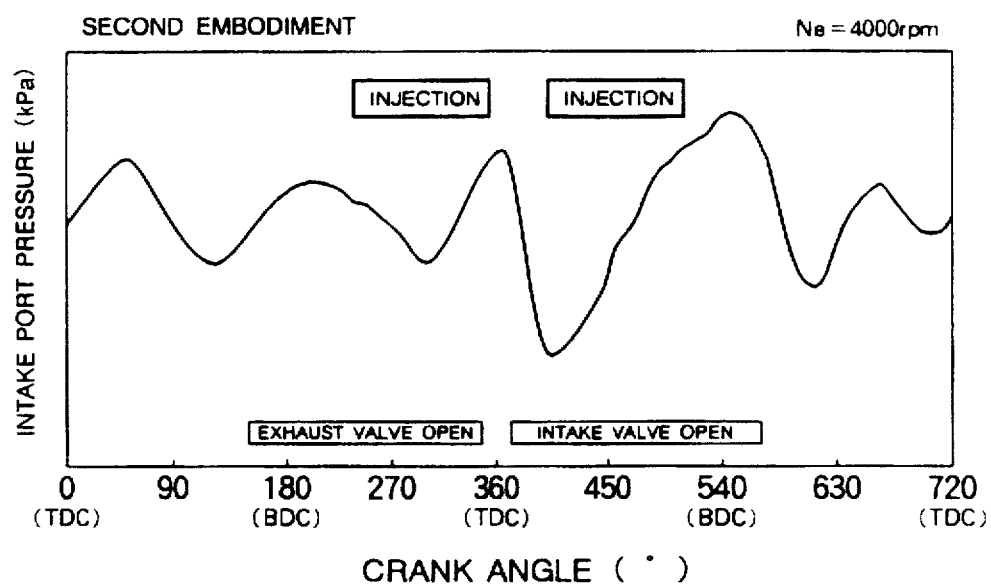
FIG. 7 is a waveform graph of pulsation inside an intake port in an example (Second Preferred Embodiment) wherein multi-stage injection was carried out at an engine speed of 4000 rpm.

FIG. 7 shows a waveform chart of a pulsation inside an intake port in another example (a second preferred embodiment) wherein multi-stage injection was carried out at an engine speed Ne of 4000 rpm; the horizontal axis is crank angle and the vertical axis is intake port pressure.

In the second preferred embodiment, to cover the trough at 280° and the large trough at 450°, first injection was started at crank angle 240° and ended at crank angle 350° and then injection was started again at crank angle 400° and ended at crank angle 515°.

In this second preferred embodiment, because the overall injection which, in the above-mentioned FIG. 5, was completed with a single injection was divided into two injections, the injection time per injection naturally is smaller.

As is clear from FIG. 7, injection may be carried out in the trough around crank angle 110° also, and injection may be performed in any suitable number of stages.

Figure 8:
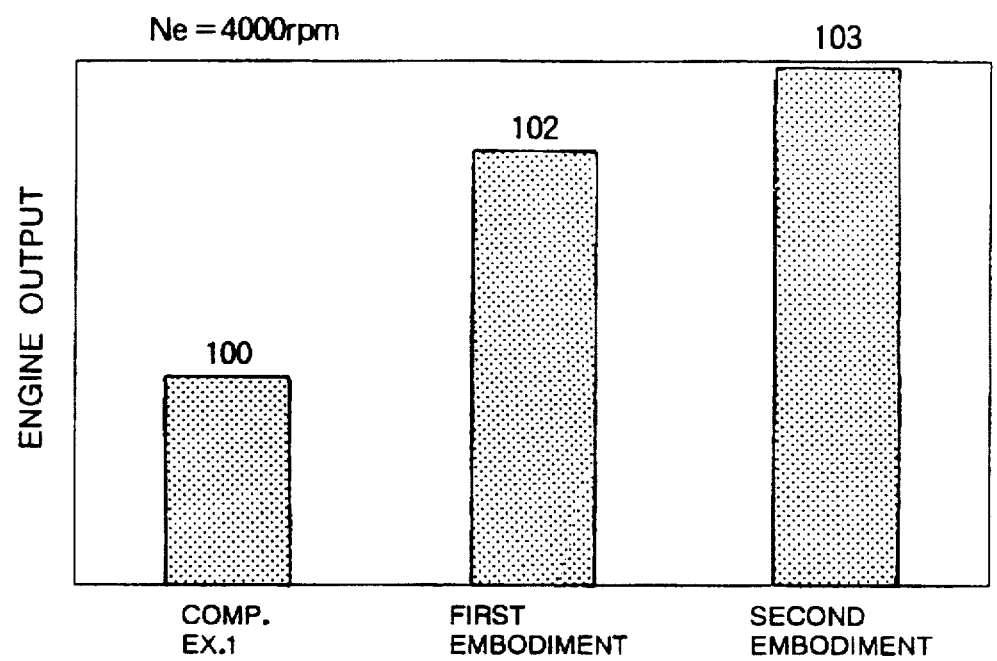
FIG. 8 is a graph comparing the first and second preferred embodiments of the invention with a first comparison example.

A graph comparing the first and second preferred embodiments of the invention and a first comparison example is shown in FIG. 8; the vertical axis is engine output.

Figure 14:
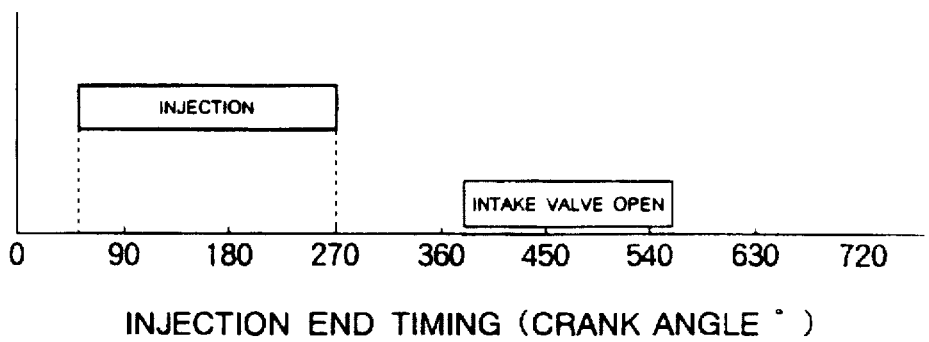
FIG. 14 is a graph showing an example of conventional fuel injection timing of a gas fuel engine.

The first comparison example is the output in a case where injection was carried out under the conditions shown in FIG. 14, the first preferred embodiment is the output obtained with the single-stage injection shown in FIG. 6 and the second preferred embodiment is the output obtained with the multi-stage injection (two-stage injection) shown in FIG. 7.

If the comparison example is made 100, the first preferred embodiment is 102 and the second preferred embodiment is 103, and output increases of 2% and 3% respectively were achieved.

Figure 9:
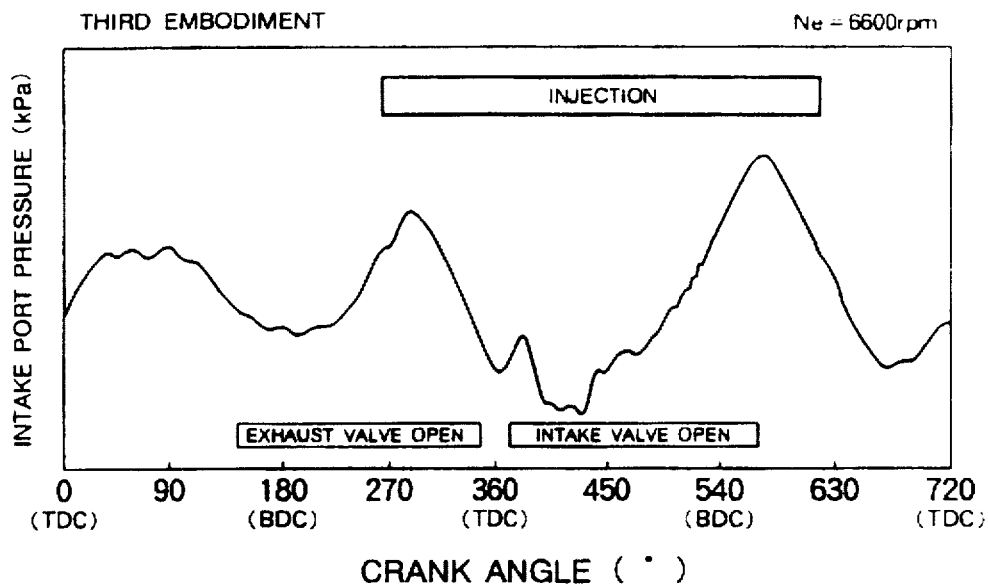
FIG. 9 is a waveform graph of pulsation inside an intake port in an example (third preferred embodiment) wherein single-stage injection was carried out at an engine speed of 6600 rpm.

FIG. 9 shows a waveform chart of a pulsation inside an intake port a third example (a third preferred embodiment) wherein single-stage injection was carried out at an engine speed Ne of 6600 rpm; the horizontal axis is crank angle and the vertical axis is intake port pressure. In this third preferred embodiment, to cover the large trough at 450°, injection was started at crank angle 260° and injection was ended at crank angle 630°.

Figure 10:
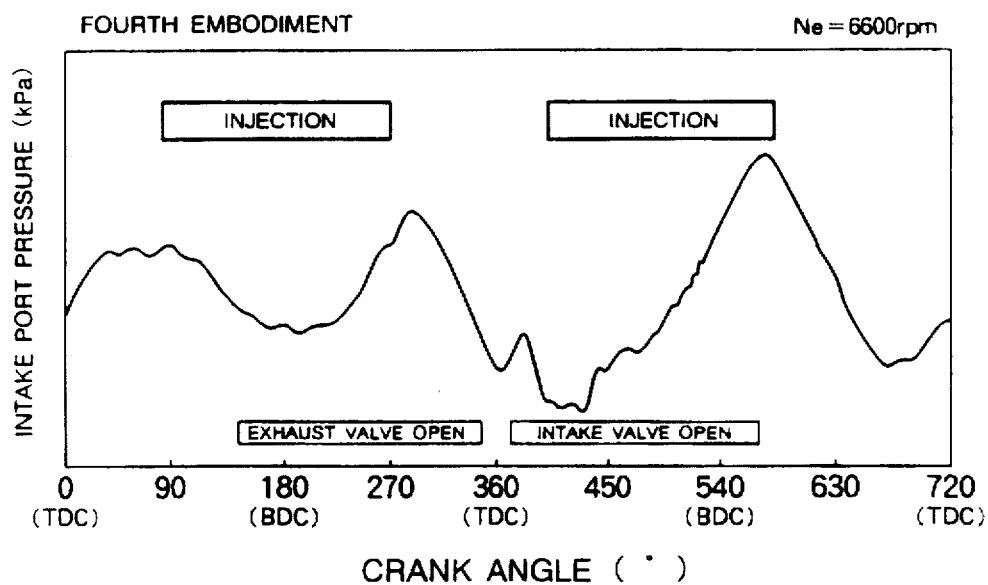
FIG. 10 is a waveform graph of pulsation inside an intake port in an example (Fourth Preferred Embodiment) wherein multi-stage injection was carried out at an engine speed of 6600 rpm.

FIG. 10 shows a waveform chart of a pulsation inside an intake port in a fourth example (a fourth preferred embodiment) wherein multi-stage injection was carried out at an engine speed Ne of 6600 rpm; the horizontal axis is crank angle and the vertical axis is intake port pressure.

In this fourth preferred embodiment, to cover the trough at 180° and the large trough at 450°, first injection was started at crank angle 80° and injection was ended at crank angle 270° and then injection was started again at crank angle 400° and ended at crank angle 595°.

Figure 11:
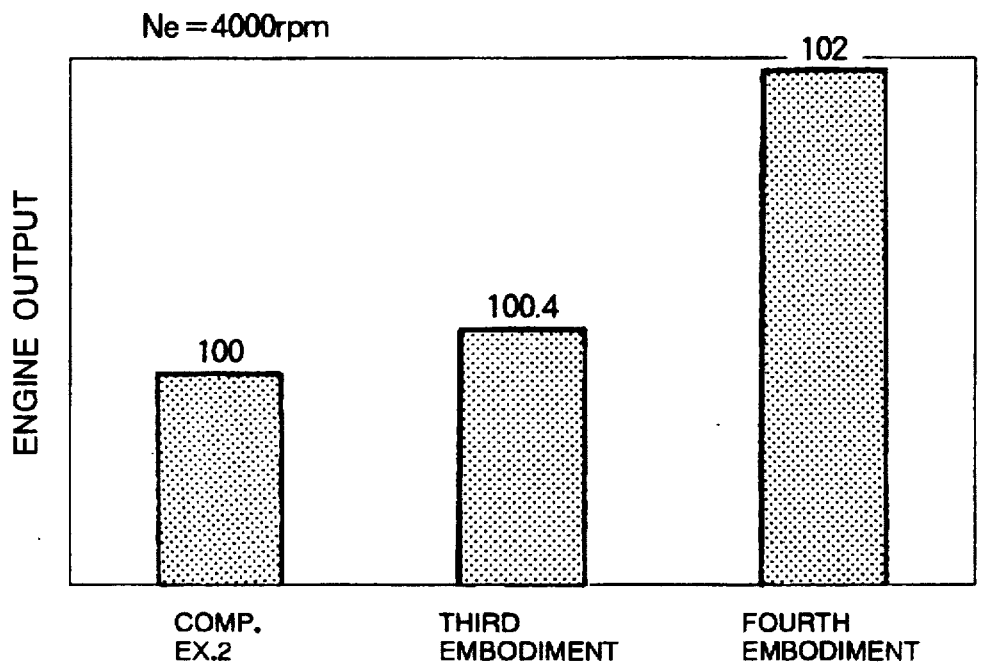
FIG. 11 is a graph comparing the third and fourth preferred embodiments of the invention with a second comparison example.

FIG. 11 shows a graph comparing the third and fourth preferred embodiments of the invention and a second comparison example, the vertical axis being engine output.

The second comparison example is the output in a case where injection was carried out under the conditions shown in FIG. 14, the third preferred embodiment is the output obtained with the single-stage injection shown in FIG. 9 and the fourth preferred embodiment is the output obtained with the multi-stage injection (two-stage injection) shown in FIG. 10.

If the second comparison example is made 100, the third preferred embodiment is 100.4 and the fourth preferred embodiment is 102, and output increases of 0.4% and 2% respectively were achieved.

Figure 12:
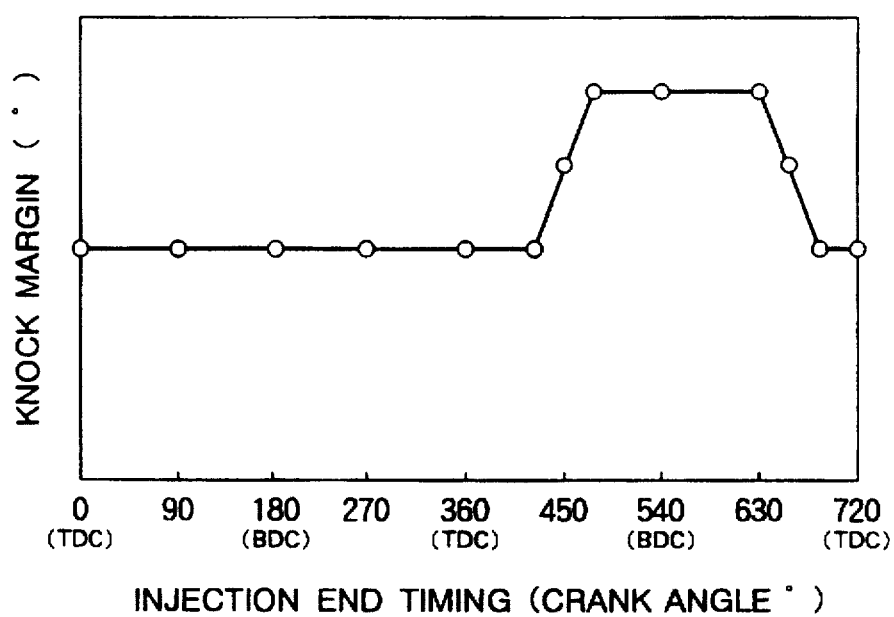
FIG. 12 is a graph showing a relationship between injection end timing and knock margin.
Figure 13:
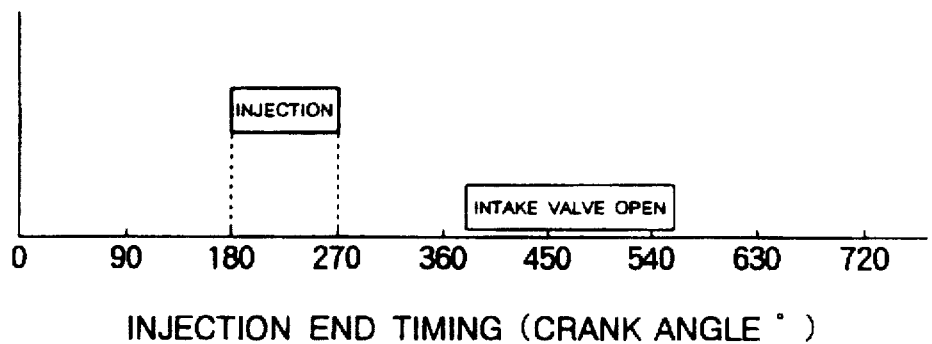
FIG. 13 is a graph showing an example of conventional fuel injection timing of a gasoline engine.

FIG. 12 is a graph showing a relationship between injection end timing and knock margin; the horizontal axis shows injection end timing by crank angle and the vertical axis is knock margin (°), defined below. The circles in the graph are injection end points similar to those in FIG. 5.

knock margin=knock occurrence angle−*MBT*

The knock occurrence angle and the MBT are crank angles BTDC (before top dead center). The MBT (Minimum advance for the Best Torque) is the ignition timing giving the best engine output, fuel consumption rate.

The greater the knock margin is, the less readily the knocking phenomenon occurs. Because the knock margin is large in the range of crank angle 420° to 690°, and especially in the range of 480° to 630°, injection should be controlled so that injection ends in this range.

The range of 480° to 690° in FIG. 5 can also be explained from the point of knock margin (preferable range 420° to 690°). Therefore, the preferable injection end timing in this invention is made the range of 480° to 690°.

To control the above-mentioned injection period, in FIG. 2, information from the engine 10 such as the engine speed, the throttle valve secondary side pressure, the crank angle, the concentration of oxygen in the exhaust, a crank pulse, a TDC pulse and cylinder identification signals are fed to the ECU. The ECU has stored in ROM injection timing calculation formulas and tables and maps or the like corresponding to engine speed and throttle valve secondary side pressure; it calculates injection timing based on this information and controls injector driving currents of the cylinders or an injector driver driving current.

The pulsation waveform is read out by the pulsation pressure sensor 27, and the crank angle of the lowest part (the bottom of the trough) of the pulsation waveform during the intake valve open period is calculated.

When the injection end timing computed from the various signals exceeds crank angle 690°, the injection period is shifted forward to deal with this.

The control procedure described above is only an example, and this procedure and the number and types of the items of information used for realizing the method of the invention may be changed.

What is claimed is:

1. A fuel injection method for a gas fuel engine having an intake port into which a gaseous fuel is injected, said method comprising the step of:

setting fuel injection end timing to be after the start of opening of an intake valve of said engine and fuel injection start timing to be before the start of opening of said intake valve of said engine.

2. A fuel injection method according to claim 1, further comprising the steps of:

causing ignition to take place at a crank angle of 0° and at a top dead center; and causing fuel injection to end at a crank angle in a range of 480°–690°.

3. A fuel injection method for a gas fuel engine having an intake port into which a gaseous fuel is injected, said method comprising the steps of:

causing the injection to take place at a plurality of divided injection periods; and making said injection periods coincide with periods in which intake port pressure falls in the shape of a trough.

* * * * *